United States Patent [19]

Katahara et al.

[11] Patent Number: 4,912,683

[45] Date of Patent: Mar. 27, 1990

[54] METHOD FOR ACOUSTICALLY MEASURING WALL THICKNESS OF TUBULAR GOODS

[75] Inventors: Keith W. Katahara, Allen; Robert W. Siegfried, II, Richardson, both of Tex.

[73] Assignee: Atlantic Richfield Company, Los Angeles, Calif.

[21] Appl. No.: 291,684

[22] Filed: Dec. 29, 1988

[51] Int. Cl.⁴ .............................................. G01V 1/40
[52] U.S. Cl. .................................... 367/25; 181/105; 73/151
[58] Field of Search .................... 181/105; 367/27, 32, 367/34, 35, 69, 911, 912; 73/627, 630, 151

[56] References Cited

U.S. PATENT DOCUMENTS

| | | | |
|---|---|---|---|
| 2,825,044 | 2/1958 | Peterson | 367/27 |
| 4,255,798 | 3/1981 | Havira | 367/35 |
| 4,587,641 | 5/1986 | DiFoggio | 367/30 |
| 4,709,357 | 11/1987 | Maki, Jr. | 367/35 |
| 4,733,380 | 3/1988 | Havira | 367/35 |

FOREIGN PATENT DOCUMENTS 1189944  7/1985  Canada .................................. 181/105

OTHER PUBLICATIONS

Dumont et al., "A Single Tool for Corrosion and Cement Evaluation", SPE 13140.

Primary Examiner—Thomas H. Tarcza
Assistant Examiner—Ian J. Lobo
Attorney, Agent, or Firm—Geoffrey A. Mantooth

[57] ABSTRACT

A method for acoustically measuring wall thickness of tubular goods utilizes an acoustical transducer with a large bandwidth and high resonant frequency to measure the thickness of thin walls. The transducer is exposed directly to fluids in the tubular goods and is rotatable 360 degrees to scan the entire circumference of the tubular goods. The transducer is excited and generates an acoustic waveform from the wall under investigation. The acoustic return has a reverberation portion which results from the reverberation of the generated acoustic waveform in the wall. The harmonic frequency content of the reverberation portion is determined and the frequency difference between two adjacent harmonics is determined, from which the wall thickness is determined.

8 Claims, 6 Drawing Sheets

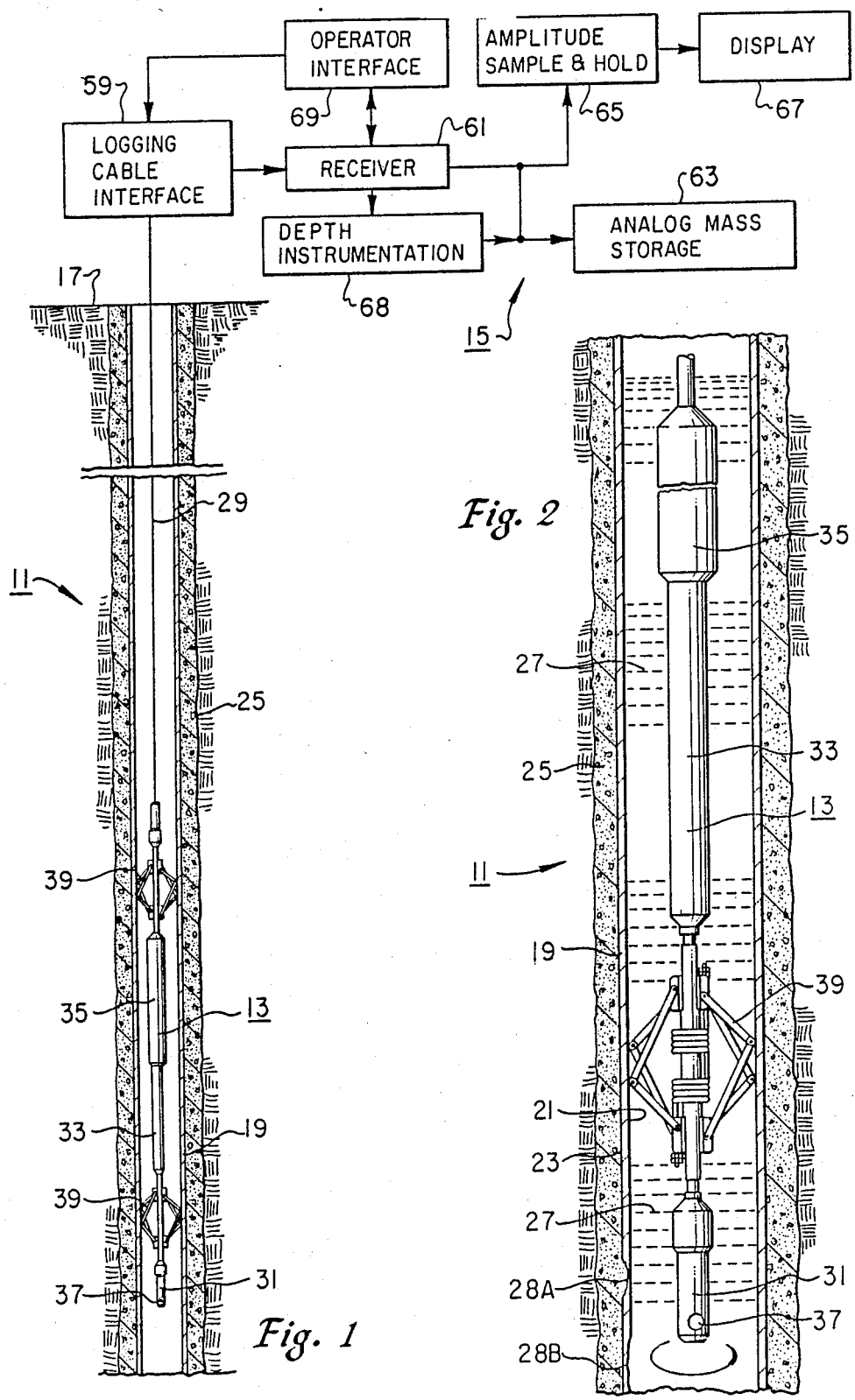

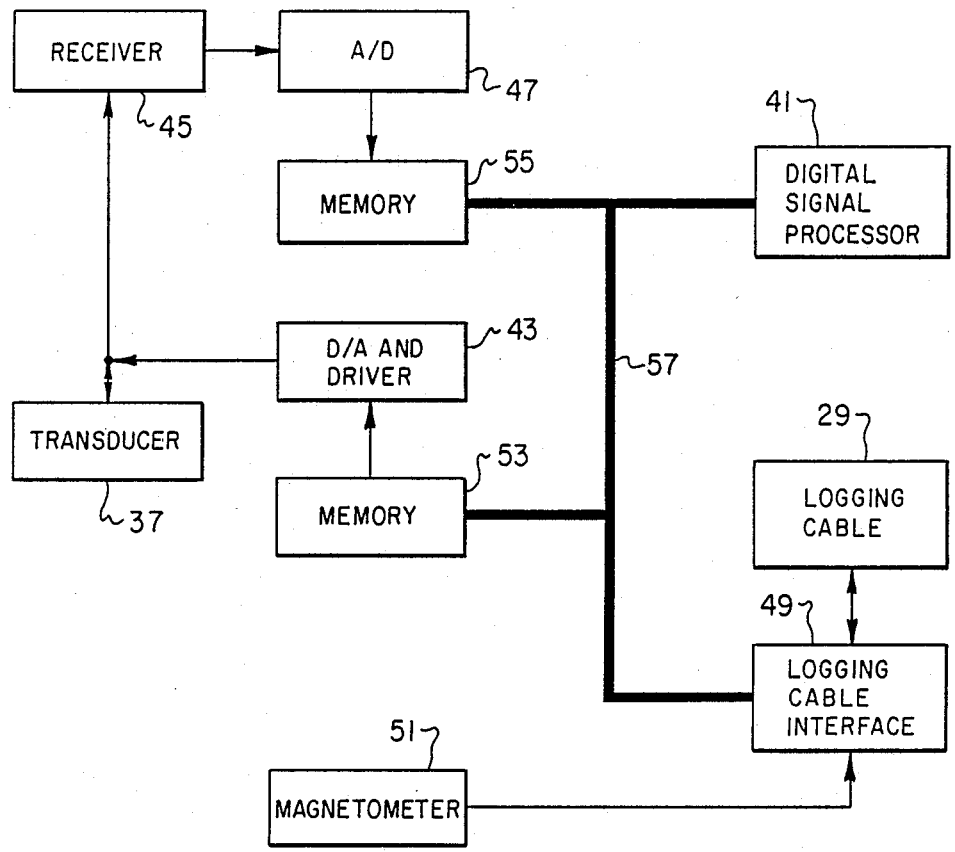
Fig. 3
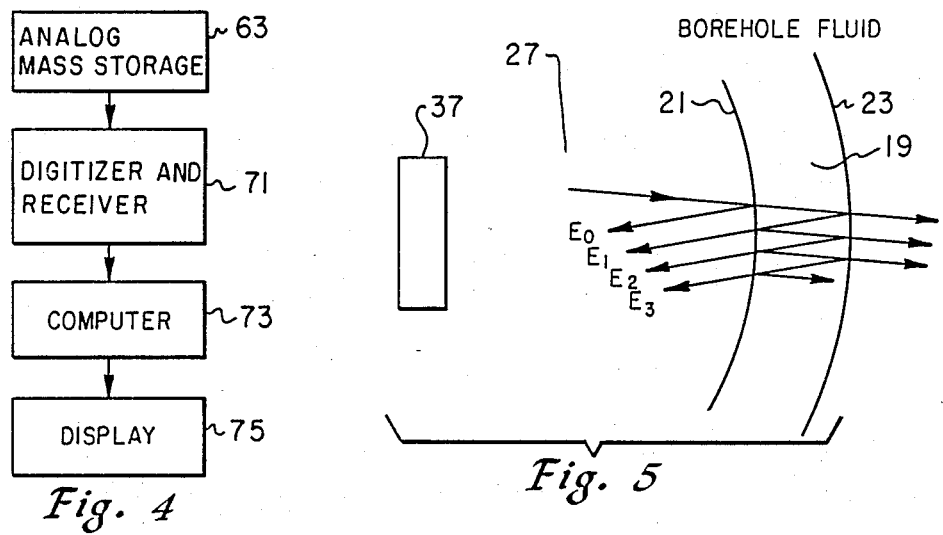
Fig. 4
Fig. 5

METHOD FOR ACOUSTICALLY MEASURING WALL THICKNESS OF TUBULAR GOODS

FIELD OF THE INVENTION

The present invention relates to methods for acoustically measuring wall thickness of tubular goods such as well casing, production tubing, pipelines and the like, wherein the presence of corrosion on the tubular goods can be determined.

BACKGROUND OF THE INVENTION

In oil and natural gas wells, casing is set into the well borehole. In the borehole, the casing is subjected to corrosive elements which act on the casing by reducing the casing wall thickness. Cement, which has been forced into the annulus between the casing and the surrounding strata, protects the outer surface of the casing from corrosion. But occasionally the bond between the cement and the casing is unsatisfactory, wherein the outer surface of the casing is exposed to corrosive elements. Furthermore, casing is typically cemented only for portions of its length, leaving exposed portions.

It is desirable to periodically survey the casing to determine the presence of corrosion and inside surface wear on the casing and the extent of damage. Corrosion (and wear) reduces the wall thickness of the casing, so by measuring the wall thickness, the presence or absence of corrosion can be inferred. Once corrosion has been detected on the casing, the situation can be evaluated and a decision can be made on whether or not to take corrective action, which corrective action is time consuming and expensive. In order to properly evaluate whether to take corrective action, the wall thickness of the corroded area, the extent of corrosion, and the location of the corrosion are factors which are considered.

In the prior art, there are apparatuses and methods for ultrasonically scanning casing to determine the presence of corrosion. However, the prior art fails to provide enough information on corrosion to make a proper evaluation. The prior art is exemplified by Zemanek, which U.S. Pat. No. 3,369,626 discloses an ultrasonic apparatus for use in scanning the inner surface of casing on the inner surface of an open well borehole. The ultrasonic apparatus, which is commercially known as the borehole televiewer, uses a rotating ultrasonic transducer housed inside of an acoustical window to provide full coverage of the casing, thus providing high areal resolution. The borehole televiewer is limited, however, to scanning he inner surface of casing, and thus cannot be used to determine corrosion occurring on the outer surface of the casing. Furthermore, the borehole televiewer uses analog signal processing, thereby limiting the capabilities of the apparatus.

Havira, U.S. Pat. No. 4,255,798 discloses an ultrasonic logging apparatus for evaluating the bond between the cement and the casing. The apparatus also determines the wall thickness of the casing for corrosion detection purposes. One version of the logging apparatus utilizes a single fixed transducer and a rotating reflector. The transducer has a bandwidth of 300 KHz–600 KHz, in order to excite the fundamental resonance of the casing wall and determine wall thickness. The relatively low bandwidth limits the resolution of the logging apparatus in determining casing wall thickness. Walls thinner than about 5mm are unresolvable. It is frequently desired to resolve thinner walls. Furthermore, the presence of the acoustical window in the path of the acoustic return causes distortion of the acoustic return, further limiting the resolution. The acoustical window could be impedance matched to reduce distortion, however varying conditions downhole, including mud weights and temperatures, make impedance matching of the acoustic return impractical.

Another version of the logging apparatus of Havira, U.S. Pat. No. 4,255,798 uses transducers which are directly exposed to the borehole fluids. Plural transducers are provided in a circumferential arrangement. Because transducers are fixed full coverage of the casing wall is not provided for, thus limiting the areal resolution of the logging apparatus.

What is needed is a method that measures wall thickness, which method has high casing wall thickness resolution and that provides full areal resolution of the casing wall, wherein corrosion on the casing wall can be detected.

SUMMARY OF THE INVENTION

It is an object of the present invention to provide a method for ultrasonically measuring wall thickness of tubular goods so that the presence of corrosion can be determined, which method has high casing wall thickness resolution and provides full areal resolution of the tubular goods.

The method of the present invention provides an acoustical transducer means inside of the tubular goods which are to be investigated. The transducer means has a resonant frequency greater than 1MHz and is directly exposed to fluids in the investigated tubular goods. The transducer means is rotatable so as to scan 360 degrees of the circumference of the investigated tubular goods. The transducer means is excited to generate an acoustic waveform, which is directed to a portion of the investigated tubular goods. The transducer means then receives the resulting acoustic return. The acoustic return includes a reverberation portion which occurs as a result of the generated acoustic waveform reverberating inside of the investigated tubular goods portion. The reverberation portion is selected from the acoustic return, and the harmonic frequency content of the reverberation portion is determined. The frequency difference between two adjacent harmonic frequencies is determined and the wall thickness of the investigated portion is determined from the frequency differences.

BRIEF DESCRIPTION OF THE DRAWINGS

FIG. 1 is a schematic longitudinal cross-sectional view of a cased well borehole, showing an ultrasonic logging apparatus therein, and supporting surface equipment, with which the method of the present invention, in accordance with a preferred embodiment, can be practiced.

FIG. 2 is a detail view of the transducer portion of the logging apparatus of FIG. 1.

FIG. 3 is a block diagram of the downhole electronics unit which is located in the ultrasonic logging apparatus.

FIG. 4 is a block diagram of the equipment which is used to process the data obtained from the ultrasonic logging apparatus and the supporting surface equipment.

FIG. 5 is a transverse cross-sectional view of a cased borehole, with a diagrammatic representation of the acoustic reflections and reverberations caused by the casing.

DESCRIPTION OF PREFERRED EMBODIMENT

Figure 6:
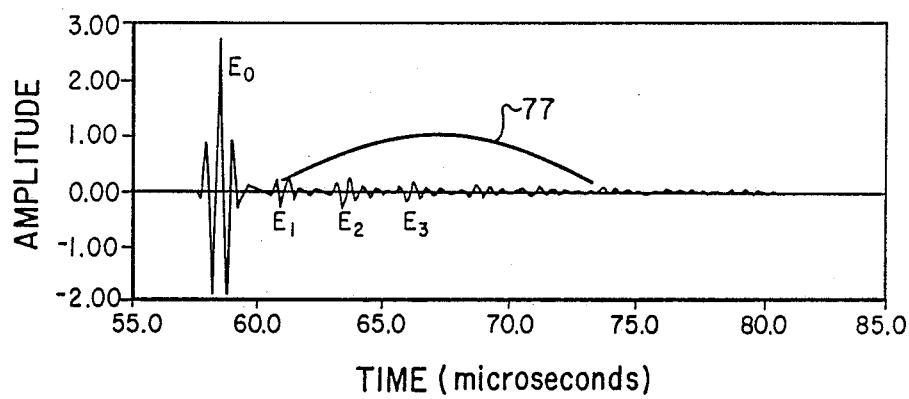
FIG. 6 is a graph showing an acoustic return of a casing wall.

In FIGS. 1 and 2, there is shown a schematic longitudinal cross-sectional view of a cased well borehole 11, showing an ultrasonic logging apparatus 13 located therein, and supporting surface equipment 15, with which the method of the present invention, in accordance with a preferred embodiment, can be practiced.

The well borehole 11, which is drilled into the earth 17, is for producing oil or natural gas. The well borehole 11 is lined with a length of casing 19. The casing wall has inner and outer surfaces 21, 23. Cement 25 fills the annulus between the casing 19 and the walls of the borehole 11, for at least some of the length of the casing. The cement 25 is used to isolate one formation from another and to support the casing. The interior of the casing is filled with borehole fluids 27, which include drilling mud, oil, or both. The casing has corrosion 28A on its outer surface 23 and wear 28B on its inner surface 21. The casing may also have corrosion on its inner surface.

Both corrosion 28A and wear 28B reduce the wall thickness of the casing 19. The logging apparatus 13 and the method of the present invention measure wall thickness, from which the presence of corrosion or wear can be inferred.

The logging apparatus 13 is located within the casing 19 an moves up or down the borehole for logging operation. The logging apparatus 13 is suspended inside of the casing by a logging cable 29, which provides electrical power and communication channels from the surface equipment 15. The logging apparatus 13 includes a transducer portion 31, a motor portion 33, and an electronics portion 35. The transducer portion 31 has an acoustical transducer 37 mounted therein. The transducer 37 is mounted so as to be directly exposed to the borehole fluids 27. The transducer 37 is oriented so as to generate acoustic waveforms which are normal to the walls of the casing 19. The motor portion 33 of the logging apparatus provides the mechanical means to rotate the transducer portion 31 360 degrees within the casing. U.S. patent application Ser. No. 162,771, filed Mar. 1, 1988, which is owned by the assignee of the present invention, shows and describes a logging apparatus having a rotatable transducer portion and an exposed transducer, which is essentially identical to the logging apparatus shown and described herein. The disclosure of U.S. patent application Ser. No. 162,771, filed Mar. 1, 1988 is incorporated by reference into this disclosure. The transducer 37 can scan the entire circumference of the casing wall. The logging apparatus is centered along the longitudinal axis of the casing by centralizers 39.

In the preferred embodiment, the acoustical transducer 37 has a resonant frequency of about 2MHz and a bandwidth of about 1.0–2.5MHz. The transducer has a lead metaniobate ferroelectric element with a front-face, quarter-wave polymer matching layer and a low impedance, high attenuation backing layer. The transducer focal length can be modified to suit the casing diameter or the borehole diameter.

Referring to FIG. 3, the electronics portion 35 of the logging apparatus 13 contains the downhole electronics, which interfaces with the transducer 37 and performs some preliminary processing of the data before transmitting the data over the logging cable 29. The electronics portion 35 includes a digital signal processor 41, a digital-to-analog (D/A) converter and driver 43, a receiver 45, an analog-to-digital (A/D) converter 47, a logging cable interface 49, and a magnetometer 11. In the preferred embodiment, the digital signal processor 41 is a TMS320C25 CMOS (complimentary metal oxide semiconductor) integrated circuit, manufactured by Texas Instruments. The digital signal processor contains some memory. The digital signal processor 41 is connected to a transmitter memory 53, a receiver memory 55, and the logging cable interface 49 by way of a data bus 57.

The transducer 37 generates an acoustic waveform which is directed to the casing wall 19. The interaction of the generated acoustic waveform with the casing wall produces an acoustic return. Referring to FIGS. 5 and 6, the acoustic return is made up of a reflection portion $E_0$, where the generated acoustic waveform is reflected off of the inner surface 21 of the casing wall, and a reverberation potion $E_1, E_2, E_3...$, where the generated acoustic waveform reverberates inside of the casing wall between the inner and outer surfaces 21,23. Because of the high frequency of the generated acoustic waveform, for uncorroded casing, the reverberation portion of the acoustic return will typically contain only the relatively higher harmonics (e.g. 3rd or 4th harmonic) of the resonant frequency of the casing.

The acoustic return is received by the transducer 37. It is desirable to obtain an acoustic return where the interference between the reflection portion and the reverberation portion is minimized, in order to simplify processing and interpretation. The acoustic return can be manipulated, to a certain extent, by manipulating the generated acoustic waveform. By producing a sharp generated acoustic waveform from the transducer, the resulting acoustic return is not burdened with undue interference. The desirable generated acoustic waveform varies from transducer to transducer and may vary under different borehole conditions.

In order to generate an acoustic waveform which results in a "clean" acoustic return, regardless of the downhole conditions of the transducer type, it is desirable to produce an arbitrary acoustic waveform from the transducer. The transmitter circuitry, which includes the digital signal processor 41, the transmitter memory 53, the D/A converter and driver 43, and the transducer 37, can produce an arbitrary or programmed waveform. The digital signal processor 41 loads the transmitter memory 53 with the programmed waveform by way of the data bus 57. The programmed waveform can either be resident in downhole memory accessible by the digital signal processor, or can be transmitted from the surface via the logging cable 29 and logging cable interface 49. The transmitter memory 53 is a first-in-first-out (FIFO) memory device that outputs the digital waveform data to the D/A converter and driver 43. The D/A converter and driver 43 converts the digital waveform into an analog waveform and amplifies the waveform. The amplified waveform is sent to the transducer 37 where an acoustical waveform is generated.

In the preferred embodiment, the programmed waveform used to excite the transducer is determined by inverse filter techniques such as are describe in Schmolke et al., "Generation Of Optimal Input Signals For Ultrasound Pulse-Echo Systems", 1982 *Ultrasonics Symposium*, IEEE, pages 929 et seq.

The receiver 45 receives the acoustic returns from the transducer 77. The receiver filters and amplifies the acoustic return. The receiver 45 includes circuitry for protecting its amplifier from the transmitted waveform sent to the transducer from the D/A converter and driver 43. The acoustic return is sent from the receiver 45 to the A/D converter 47 where the signal is digitized. The digitized acoustic return is loaded into the receiver memory 55, which is a FIFO memory unit. The digitized acoustic return is then either processed by the digital signal processor 41 or sent uphole by the logging cable interface 49.

The logging cable interface 49 both transmits data uphole over the logging cable 29 and receives data sent downhole on the logging cable. Because of bandwidth limitations of the logging cable 29, the logging cable interface 49 may convert the digitized acoustic return into a form more suitable for transmission over the logging cable. In the preferred embodiment, the logging cable interface includes a D/A converter for converting the digitized acoustic return into an analog signal, wherein the analog acoustic return is transmitted up the logging cable. The digitized acoustic return is converted into an analog signal in order to more effectively transmit data over the logging cable, which has a limited bandwidth.

The magnetometer 51 provides information on the azimuthal orientation of the transducer 37 inside of the borehole 11. The magnetometer 51 is connected to the logging cable interface 49 in order to transmit its azimuthal information uphole over the logging cable.

Referring to FIG. 1, the surface equipment 15 will now be described. The surface equipment includes a logging cable interface 59, similar to the downhole logging cable interface 49. The data received from the logging apparatus 13 is sent to a receiver 61 from the logging cable interface 59, where it is filtered and amplified. The receiver 61 then sends the data to the analog mass storage unit 63, where the data is stored to await subsequent processing. The analog mass storage unit 63 can be, for example, a tape unit. The receiver 61, also sends the data to an amplitude sample and hold unit 65, so that the amplitude of the acoustic return can be monitored on the display 67 by an operator. The display 67 can also display an entire acoustic return. Conventional depth instrumentation 68 provides information on the depth of the logging apparatus. The operator can, through the operator interface 69, communicate with the logging apparatus 13 and the uphole receiver 61 to change various parameters of the equipment, such as the pulse repetition rate of the transducer and the cable driving rate.

Figure 12:
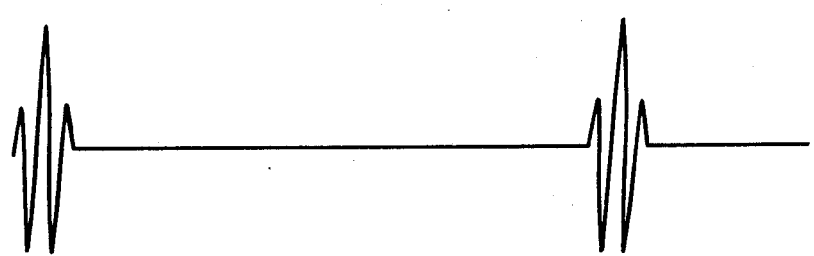
FIG. 12 is a graph showing a generated acoustic waveform as produced by the transducer.

To log the casing 19 in the borehole 11, the logging apparatus 13 is lowered down into the borehole until the desired depth is reached (see FIGS. 1 and 2). The transducer portion 31 of the logging apparatus is rotated so that the entire circumference of the borehole is exposed to the transducer 37. As the transducer portion is rotated, the transducer 37 is periodically excited to produce a generated acoustic waveform (see FIG. 12). Then, the transducer receives the acoustic return from the casing wall. As the transducer portion is rotated, the logging apparatus 13 is pulled up the borehole. Thus, the logging apparatus 13 scans the casing wall in a helical pattern, with the individual scanned spots overlapping to provide full coverage. As a typical example, for most pipe sizes, if the transducer pulse repetition rate is 200 pulses (or generated acoustic waveforms) per rotation, the transducer portion is rotated at 3 revolutions per second, the vertical logging speed is 5 feet per second, and the transducer spot size is ½ inches, full coverage of the casing wall can be obtained.

The method of processing the data from the acoustic returns to determine casing wall thickness will now be described. Because of the large amount of data generated by the logging apparatus, in the preferred embodiment, the data is stored on an analog mass storage unit 63 for subsequent processing. FIG. 4 illustrates the data processing equipment, which includes the analog mass storage unit 63, a digitizer and receiver unit 71, a computer 73, and a display unit 75.

To process the acoustic return to determine the periodicity of the casing reverberations, the acoustic return is first read from the mass storage unit 63 to the digitizer and receiver 71. The digitizer and receiver 71 digitize, filters, and amplifies the reverberation portion of the acoustic return to form a time series. The digitizing rate is sufficiently fast so as to avoid any aliasing of the signal. For a transducer having a bandwidth up to 3MHz, a sampling rate of 10MHz is used to avoid aliasing. The reflection portion need not be digitized and processed to determine wall thickness; although the reflection portion can be processed to investigate the inner surface of the casing as provided in Zemanek, U.S. Pat. No. 3,369,626. The digitized acoustic return is sent to the computer 73 for further processing.

To determine the thickness of the investigated casing wall portion, the periodicity of the casing reverberations of the acoustic return is determined. Referring to FIG. 6, the reverberation portion time series, which includes wavelets $E_1, E_2, E_3$ is passed through a weighted window 77 before the frequency spectrum of the reverberation portion is determined. The reverberation portion $E_1, E_2, E_3$... is multiplied by the window 77. The weighted window 77, with the shape and position relative to the acoustic return as shown in FIG. 6, is used to compensate for taking the Fourier transform of a finite time series. The window 77 is weighted by tapering it, with more weight going to the central portion (in FIG. 6 about 67 microseconds) of the time series than to the end portions (about 61 microseconds and 73 microseconds) of the time series. Tapering reduces the side lobes in the frequency spectrum of the time series. In determining the proper weighting that is applied to the time series, there is a compromise that can be achieved between too little or too much weighting. A rectangular window (having equal weight across the time series) has a first side lobe that is too large. On the other hand, excessive tapering of the weighted window will reduce spectral resolution. A weighting function that has been found to work satisfactorily is:

$$W(t) = \frac{I_0(b[1 - t^2/T^2]^{\frac{1}{2}})}{I_0(b)}$$

where $I_0$ is the modified Bessel function of the first kind of the order zero, t is the time sample in seconds, T is the window half-width in seconds, and b is a selectable parameter. Values of b between 3 and 4 have been found to work well.

The next step involves taking the fast Fourier transform of the windowed time series, in order to obtain the frequency spectrum of the time series. The magnitude spectrum (see FIG. 7) is determined from the frequency spectrum by squaring the complex time series of the frequency spectrum and then determining the square root of the real portion of the squared complex time series. Alternatively, the power spectrum could be used, which is determined from the real portion of the squared complex time series. The magnitude spectrum is filtered by excluding time samples which lie outside of the transducer bandwidth (about 1.0MHz to 2.7MHz in FIG. 7).

Once the frequency (magnitude) spectrum has been determined, the casing wall thickness at the investigated portion can be determined by looking at the harmonic frequencies present in the reverberation portion of the frequency spectrum. As a condition for resonance, which causes reverberation, there are an integral number of wavelengths in twice the distance between the inner and outer surfaces 21,23 of the casing wall:

$$N\lambda = 2L$$

where N is an integer, $\lambda$ is the wavelength of the resonant acoustic signal, and L is the distance between the inner and outer surfaces of the casing wall.

$$\lambda = V/f$$

where f is the harmonic frequency and V is the velocity of sound in steel (6 mm/microsecond).

For the Nth harmonic:

$$\frac{NV}{f_N} = 2L,$$

$$\text{so } f_N = \frac{NV}{2L}.$$

For the Nth + 1 harmonic:

$$f_{N+1} = \frac{(N+1)V}{2L},$$

so the difference in harmonic frequencies is:

$$f_{N+1} - f_N = \frac{V}{2L},$$

$$L = \frac{V}{2(f_{N+1} - f_N)}.$$

Figure 7:
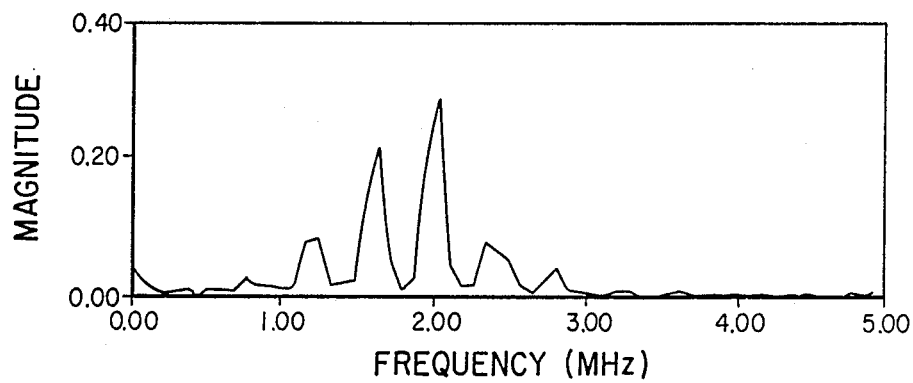
FIG. 7 is the frequency spectrum of the reverberation portion of the acoustic return of FIG. 6.
Figure 8:
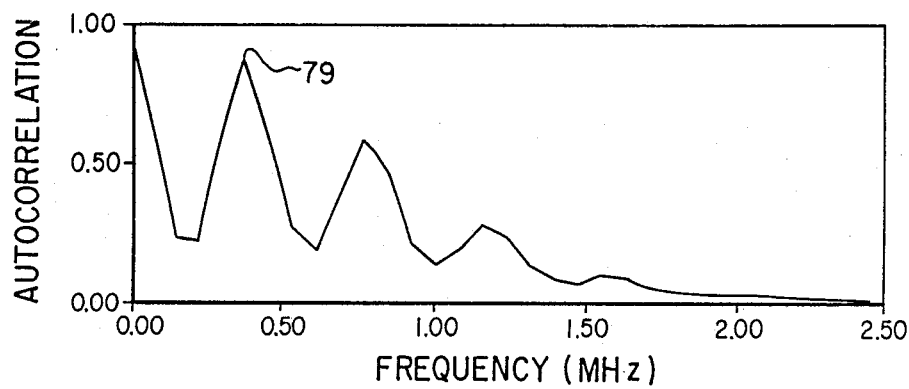
FIG. 8 is an autocorrelated frequency spectrum of the spectrum of FIG. 7.

To determine the wall thickness, the difference in harmonic frequencies is determined. In FIG. 7, the harmonic frequencies are shown by peaks. To determine the frequency difference between peaks, that portion of the frequency spectrum which is within the transducer bandwidth (about 0.6 to 3MHz in FIG. 7) is auto correlated (see FIG. 8). The autocorrelation is determined according to:

$$AC(LAG) = \frac{1}{N - LAG} \sum_{I=1}^{N-LAG} S(I)S(I + LAG),$$

where AC is the autocorrelation, N is the number of points in the transducer bandwidth, S is the frequency spectrum (as shown in FIG. 7), and LAG assumes values from 0 to N−1. The autocorrelation is searched for the position of a first peak 79 which is the resonant frequency of the casing wall portion (which in FIG. 8 is at about 0.37MHz). Quadratic interpolation is used to determine the position and frequency $F_p$ of the first peak. The wall thickness of the casing wall portion is then determined by using the frequency $F_p$ in the expression $f_{N+1} - f_N$.

An alternative method for finding the frequency difference between harmonic frequencies can be used in lieu of autocorrelation. The digitized acoustic return time series is first squared. Then, the frequency spectrum is determined from the squared time series. Before squaring the time series, the time series is filtered to reduce noise.

Figure 9:
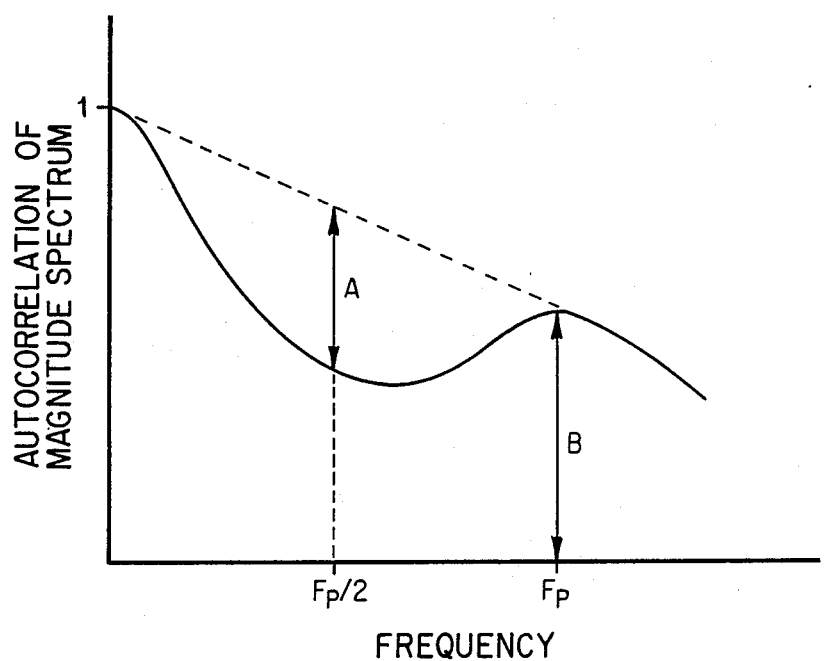
FIG. 9 is a graph illustrating the determination of the confidence level of a schematic autocorrelated reverberation portion.

A confidence level can be calculated to measure the reliability of the wall thickness measurement. Referring to FIG. 9, where an autocorrelation is shown schematically, the confidence level C is determined from:

$$C = AB$$

where A is the distance from the autocorrelation to a line connecting the initial peak at the origin to the first peak at Fp, at a frequency midway between the origin and Fp, and B is the height of the first autocorrelation peak. The confidence level provides an indication of the peakedness of the first autocorrelation peak. The higher the confidence level, the more reliable the wall thickness measurement.

Figure 10:
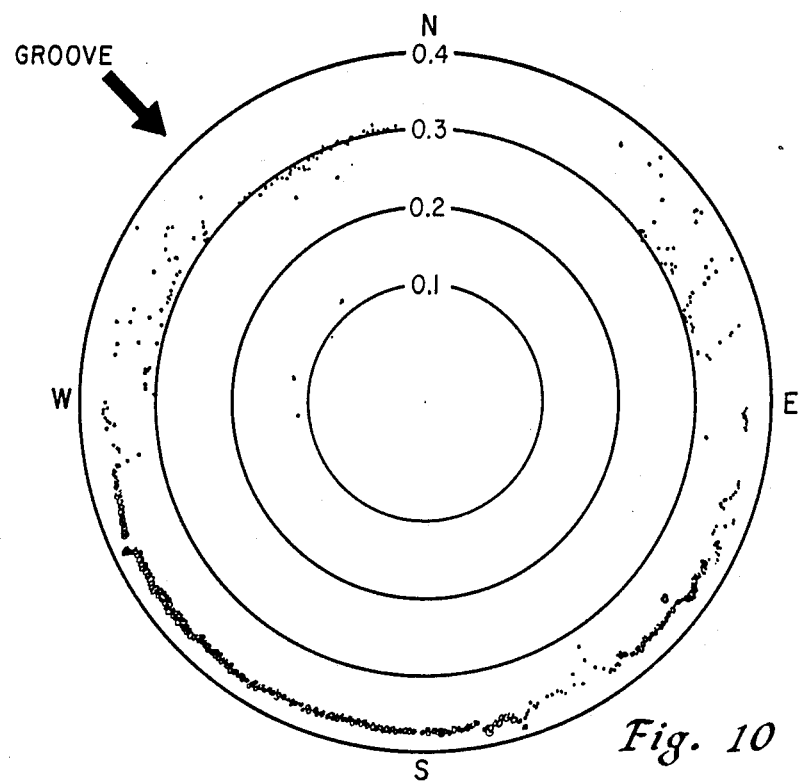
FIG. 10 is a graph showing ultrasonic measurements of a transverse section of casing, utilizing the method of the present invention, which casing has a groove formed in its northwest circumferential portion.
Figure 11:
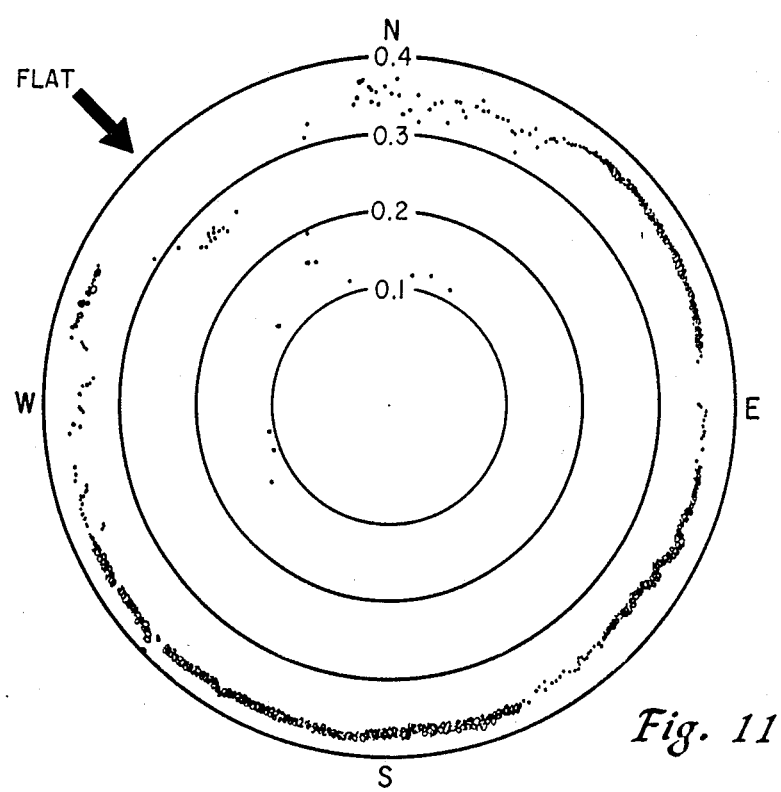
FIG. 11 is a graph showing ultrasonic measurements of a transverse section of casing, utilizing the method of the present invention, which casing has a flattened area in its northwest circumferential portion.

The data can be displayed in one of several ways. In FIGS. 10 and 11, there are shown polar graphs of a circumferential portion of casing. In FIG. 10, the casing portion has machined in its northwest circumferential portion an external groove. The thickness of the casing wall is shown as a linear function o radius. The azimuthal orientation information is shown by compass points, designated by N, S, E, W. In the southern circumferential portion of the casing, the wall thickness is about 0.36 inches. At the bottom of the groove, the wall thickness is about 0.30 inches. These measurements are very close to the actual wall thicknesses. The scatter from the edges of the groove and in the northeast circumferential portion are caused by surfaces which scatter the acoustic return in directions away from the transducer 31. The confidence level is indicated by the size of the data circles. The larger the circles, the higher the confidence level and thus the reliability. Thus, in the southern circumferential portion, the confidence level is higher than in the northeastern circumferential portion. In FIG. 11, the casing portion has machined in its northwest portion an external flat area. The center of flat area is shown by the cluster of data circles at about 0.22 inches. The edges of the flat area result in scattered data.

Figure 13:
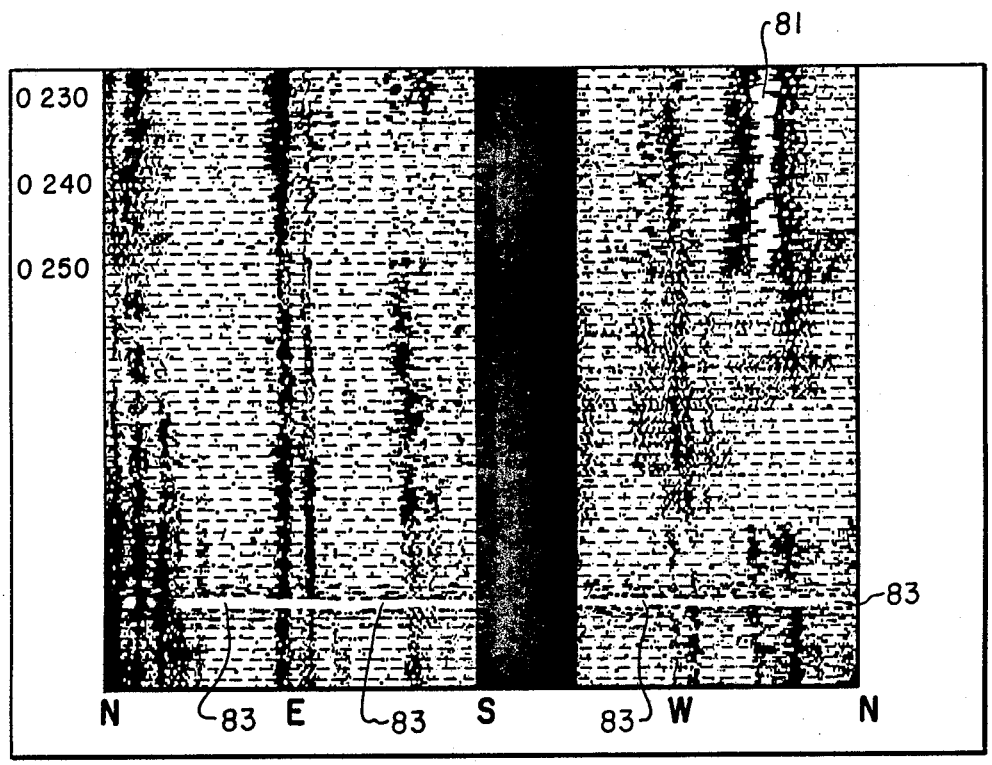
FIG. 13 is an ultrasonic log of a portion of casing wall, shown unwrapped.

The data can also be displayed in a rectangular graph, as shown in FIG. 13. Depth is along the vertical axis and azimuth is along the horizontal axis. This type of graph allows the casing wall to be "unwrapped" for inspection. The data is plotted according to a gray scale where light areas indicate thin walls and darker areas indicate thicker walls. This portion of casing has a flat area 81 and a circumferential groove 83. In FIG. 13, the darkest areas indicate areas with no reliable data. Such areas typically occur due to scattering of the acoustic return. Scattering occurs where either of the inner or outer surfaces 21, 23 are not perpendicular to the generated acoustic waveform beam. In FIG. 1, the lightest area 81 which indicates the bottom of the groove is juxtaposed with dark areas, indicating that scattering has occurred at the sides of the flat area. Some scattering is noticeable at the sides of the groove 83 as well. The depth scale can be expanded or compressed to a scale which is convenient or which aids in interpretation. The depth information is provided by the depth instrumentation 68. The azimuthal information is provided by the magnetometer 51 In many cased boreholes, the magnetometer cannot be used because the earth's magnetic field is attenuated by the casing, so a revolution counter is used instead.

When evaluating casing for corrosion damage, the minimum wall thickness of the corroded area, and the extent and location of the corroded area are the relevant factors that are used. The method of the present invention determines the areas of minimum wall thickness and provides a measurement of that thickness. Thus, although data is scattered at the edges of grooves, flats, and other areas of minimum wall thickness, the minimum wall thickness can be measured and the casing can be evaluated. The extent of the corroded areas is provided by the high areal resolution in which full coverage of the casing wall is ensured. The location of the corroded areas is provided by the magnetometer (for azimuthal information) and depth instrumentation.

The method of the present invention can be used to resolve the thickness of thin walls. Using a transducer having a resonant frequency of 2MHz and a bandwidth of 1-2.5MHz, a wall thickness of 1.5 mm can be resolved. Uncorroded casing wall thickness range from ¼ inches (about 6.5 mm) to ½ inches (about 13 mm). The method of the present invention provides a high resolution wall thickness measurement, particularly on thin-walled casing, so that a proper evaluation of the condition of the casing can be made.

Although the invention has been described in the context of using off-site processing of the data, processing equipment can be brought on-site to the borehole to allow processing. Furthermore, the downhole electronics portion can be modified to allow downhole or real-time processing.

Although the method of the present invention has been described in conjunction with measuring casing wall thickness, other types of tubular goods wall thickness can be measured, such as production tubing.

Although this invention has been described with a certain degree of particularity, it is understood that the present disclosure is made only by way of example and that numerous changes in the details of construction and the combination and arrangement of parts may be resorted to without departing from the spirit and scope of the invention, reference being had for the latter purpose to the appended claims.

We claim:

1. A method for acoustically measuring wall thickness of tubular goods, said tubular goods wall having a resonant fundamental frequency and higher harmonic frequencies, comprising the steps of:
    (a) providing acoustical transducer means inside of the tubular goods which are to be investigated, said transducer means having a resonant frequency greater than 1MHz and being directly exposed to fluids in said investigated tubular goods, said transducer means being rotatable so as to scan 360 degrees of the circumference of said investigated tubular goods;
    (b) exciting said transducer means to generate an acoustic waveform which is directed to a portion of said investigated tubular goods, said generated acoustic waveform having a frequency bandwidth containing the resonant harmonic frequencies of said tubular goods wall;
    (c) receiving with said transducer means an acoustic return from said portion of said investigated tubular goods, said acoustic return comprising a reverberation portion, said reverberation portion occurring as a result of said generated acoustic waveform reverberating inside of said portion of said investigated tubular goods wall;
    (d) selecting said reverberation portion from said acoustic return;
    (e) determining the frequency spectrum of said reverberation portion, determining the power or magnitude spectrum from said frequency spectrum autocorrelating the said power or magnitude spectrum, determining from said autocorrelation the frequency difference between two adjacent harmonic frequencies, and determining the wall thickness of said investigated portion from said frequency difference.

2. The method of claim 1 wherein said tubular goods comprise casing and said transducer means has a resonant frequency of at least 2MHz.

3. A method for acoustically measuring wall thickness of tubular goods, said tubular goods wall having a resonant fundamental frequency and higher harmonic frequencies, comprising the steps of:
    (a) providing acoustical transducer means inside of the tubular goods wall which is to be investigated, said transducer means having a resonant frequency of at least 1MHz and being directly exposed to fluids in said investigated tubular goods, said transducer means producing a generated acoustic waveform having a frequency bandwidth containing the resonant harmonic frequencies of said tubular goods wall;
    (b) exciting said transducer means to produce said generated acoustic waveform which is directed to a portion of said investigated tubular goods;
    (c) receiving with said transducer means an acoustic return from said portion of said investigated tubular goods, said acoustic return comprising a reverberation portion, said reverberation portion occurring as a result of said generated acoustic waveform reverberating inside of said portion of said investigated tubular goods wall;
    (d) selecting said reverberation portion from said acoustic return;

(e) determining the difference in harmonic frequencies of the reverberation portion by determining the frequency spectrum of said reverberation portion or magnitude spectrum from said frequency spectrum autocorrelating the said power or magnitude spectrum, and determining from said autocorrelation the frequency difference between two adjacent harmonic frequencies;

(f) determining the wall thickness of said investigated portion by the formula:

$$L = V/2(f_{N+1} - f_N)$$

where L is the wall thickness of the investigated portion, V is the velocity of sound in the wall, and $f_{N+1} - f_N$ is the difference in harmonic frequencies of the reverberation portion.

4. The method of claim 3 wherein said reverberation portion is selected from said acoustic return by multiplying the reverberation portion with a weighting function of:

$$W(t) = \frac{I_0(b[1 - t^2/T^2]^{\frac{1}{2}})}{I_0(b)}$$

where $I_0$ is a modified Bessel function of the first kind of the order zero, t is the time sample in seconds, T is the window half-width in seconds, and b is a selectable parameter of between 3 and 4.

5. The method of claim 4 further comprising the step of determining a confidence level which measures the reliability of the wall thickness determination, the confidence level C being determined from said autocrorrelation by:

$$C = AB$$

where B is the height of the first autocorrelation peak and A is the distance from the autocorrelation to a line connecting the initial peak at the origin of the autocorrelation to the first peak of the autocorrelation, wherein a higher confidence level indicates a more reliable wall thickness measurement than a lower confidence level.

6. The method of claim 5 further comprising the steps of:

(a) scanning said wall portion to produce plural measurements over said wall portion;

(b) representing the plural measurements in a two-dimensional display, with the measurements being displayed in a spatial arrangement with respect to each other that corresponds to the spatial arrangement of the measurements as taken on the wall portion;

(c) representing the confidence level of each measurement in the display by contrasting the appearance of measurements in the display having dissimilar confidence levels and equating the appearance of measurements in the display having similar confidence levels.

7. The method of claim 3 further comprising the step of determining a confidence level which measures the reliability of the wall thickness determination, the confidence level C being determined from said autocorrelation by:

$$C = AB$$

where B is the height of the first autocorrelation peak and A is the distance from the autocorrelation to a line connecting the initial peak at the origin of the autocorrelation to the first peak of the autocorrelation, wherein a higher confidence level indicates a more reliable wall thickness measurement than a lower confidence level.

8. The method of claim 7 further comprising the steps of:

(a) scanning said wall portion to produce plural measurements over said wall portion;

(b) representing the plural measurements in a two-dimensional display, with the measurements being displayed in a spatial arrangement with respect to each other that corresponds to the spatial arrangement of the measurements as taken on the wall portion;

(c) representing the confidence level of each measurement in the display by contrasting the appearance of measurements in the display having dissimilar confidence levels and equating the appearance of measurements in the display having similar confidence levels.

* * * * *

UNITED STATES PATENT AND TRADEMARK OFFICE
CERTIFICATE OF CORRECTION

PATENT NO. : 4,912,683

DATED : March 27, 1990

INVENTOR(S) : Katahara, K.W., et al.

It is certified that error appears in the above-identified patent and that said Letters Patent is hereby corrected as shown below:

In Column 11, line 4, after "tion", insert ---, determining the power---.

Signed and Sealed this

Fourteenth Day of January, 1992

Attest:

HARRY F. MANBECK, JR.

Attesting Officer      Commissioner of Patents and Trademarks